US011648892B2

(12) United States Patent
Tange et al.

(10) Patent No.: US 11,648,892 B2
(45) Date of Patent: May 16, 2023

(54) NOISE REFLECTOR, FENDER LINER, AND SILENCING METHOD

(71) Applicant: INOAC CORPORATION, Nagoya (JP)

(72) Inventors: Katsuhiro Tange, Inazawa (JP); Hiroki Sugimoto, Toyota (JP); Naokuni Hayakawa, Nishio (JP)

(73) Assignee: INOAC CORPORATION, Nagoya (JP)

( * ) Notice: Subject to any disclaimer, the term of this patent is extended or adjusted under 35 U.S.C. 154(b) by 45 days.

(21) Appl. No.: 17/323,102

(22) Filed: May 18, 2021

(65) Prior Publication Data

US 2021/0370854 A1 Dec. 2, 2021

(30) Foreign Application Priority Data

Jun. 1, 2020 (JP) .............................. JP2020-095205
Jun. 1, 2020 (JP) .............................. JP2020-095215

(51) Int. Cl.
*B60R 13/08* (2006.01)

(52) U.S. Cl.
CPC ...... *B60R 13/0838* (2013.01); *B60R 13/0861* (2013.01)

(58) Field of Classification Search
CPC .. B60R 13/0838; B60R 13/0861; B62D 25/18
USPC ........................................................ 181/204
See application file for complete search history.

(56) References Cited

U.S. PATENT DOCUMENTS

| 4,420,062 | A | * | 12/1983 | Fukushima | ............. | F02B 77/13 |
| | | | | | | 181/204 |
| 2006/0214474 | A1 | * | 9/2006 | Omiya | ................ | B60R 13/0861 |
| | | | | | | 296/198 |
| 2009/0152901 | A1 | * | 6/2009 | Takeuchi | ............. | B62D 25/161 |
| | | | | | | 29/428 |
| 2015/0329153 | A1 | * | 11/2015 | Oohashi | ................ | B62D 35/02 |
| | | | | | | 296/180.1 |
| 2016/0137027 | A1 | * | 5/2016 | Nagano | ............. | B60H 1/00564 |
| | | | | | | 454/141 |

FOREIGN PATENT DOCUMENTS

| DE | 102018128163 A1 | * | 5/2020 |
| JP | 2004-170584 A | | 6/2004 |
| JP | 2019-089491 A | | 6/2019 |

* cited by examiner

*Primary Examiner* — Yi-Kai Wang
(74) *Attorney, Agent, or Firm* — Oliff PLC (57) ABSTRACT

A noise reflector configured to reduce engine sound passing below a side member of a vehicle and leaking laterally from the vehicle. The noise reflector is disposed on a lower side of a lower surface of the side member, has a sound reflective surface tilted from a vertical direction to be directed downward as being gradually laterally distant from an engine, and is configured to reflect downward engine sound received by the sound reflective surface and cause the engine sound thus reflected to interfere with engine sound passing below the side member.

19 Claims, 14 Drawing Sheets

NOISE REFLECTOR, FENDER LINER, AND SILENCING METHOD

BACKGROUND OF THE INVENTION

(1) Field of the Invention

The present disclosure relates to a noise reflector configured to reduce engine sound leaking outward from a vehicle, a fender liner including the noise reflector, and a silencing method.

(2) Description of Related Art

There has been known, as such a type, a noise reflector covering an engine from below (e.g. JP 2004-170584 A (Paragraphs [0013] and [0014], and FIG. 1)).

SUMMARY OF THE INVENTION

In contrast to the conventional noise reflector mentioned above, demanded is development of techniques for further reduction of laterally leaking engine sound.

According to a first aspect of the invention devised to achieve the object mentioned above, there is provided a noise reflector configured to reduce engine sound passing below a side member of a vehicle and leaking laterally from the vehicle, in which the noise reflector is disposed on a lower side of a lower surface of the side member, has a sound reflective surface tilted from a vertical direction to be directed downward as being gradually laterally distant from an engine, and is configured to reflect downward engine sound received by the sound reflective surface and cause the engine sound thus reflected to interfere with engine sound passing below the side member. Examples of the side member include both a side member extending along a substantially entire side in an anteroposterior direction of the vehicle, and a front side member extending in the anteroposterior direction in an engine room of the vehicle.

According to a thirteenth aspect of the present invention, there is provided a silencing method for reducing engine sound passing below a side member of a vehicle and leaking laterally from the vehicle, the silencing method including causing engine sound to be reflected downward by a noise reflector provided on a lower side of the side member and interfere with engine sound passing below the side member.

DETAILED DESCRIPTION OF PREFERRED EMBODIMENTS

First Embodiment

Figure 1:
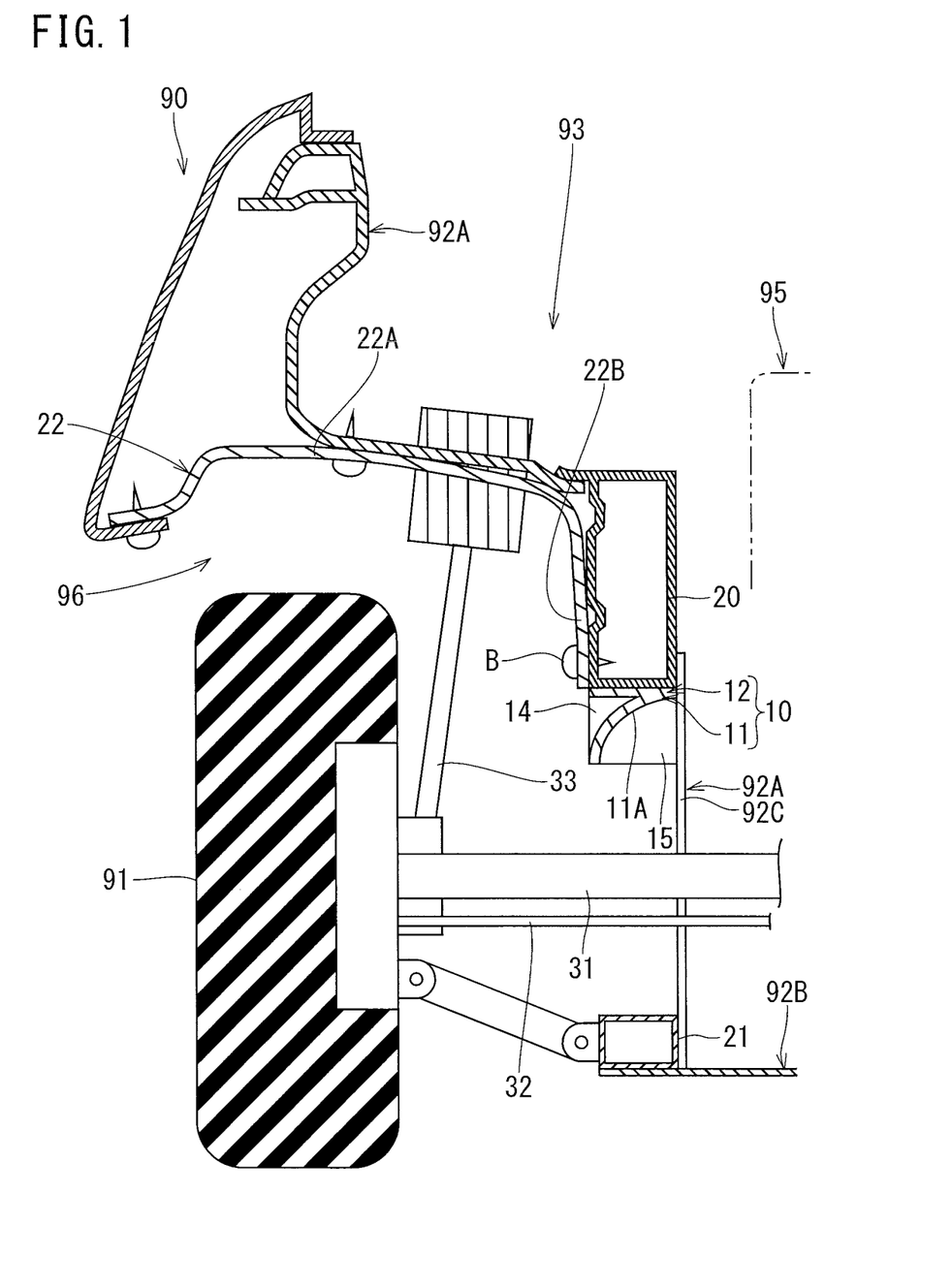
FIG. 1 is a sectional front view of a front portion of a vehicle according to a first embodiment.
Figure 2:
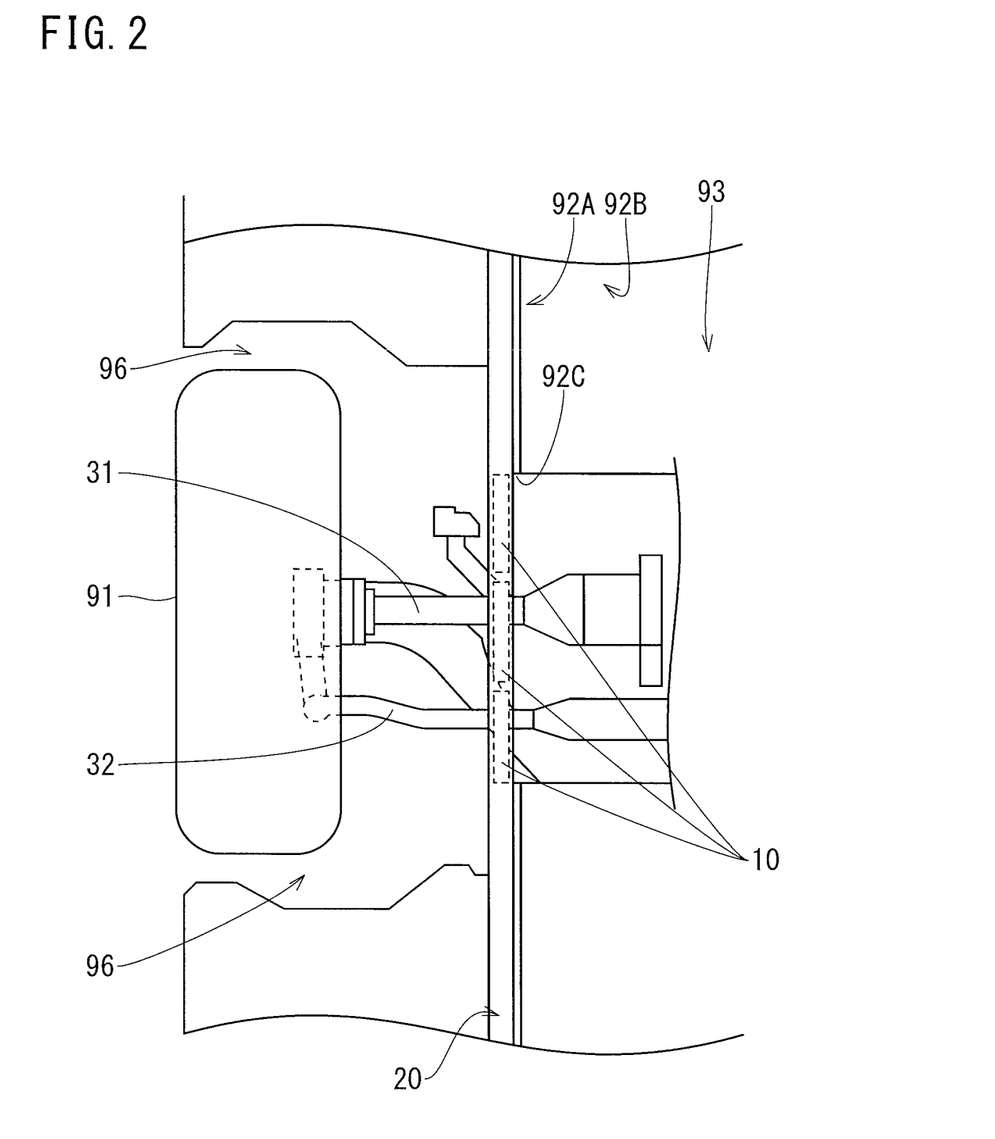
FIG. 2 is a plan view of a wheelhouse from above the vehicle.

Described hereinafter with reference to FIGS. 1 to 6 is a vehicle 90 including a noise reflector 10 according to the first embodiment of the present disclosure. The vehicle 90 depicted in FIG. 1 according to the present embodiment is configured as a passenger car including an engine 95 equipped in a front portion and configured to drive front wheels 91. The vehicle 90 includes an engine room 93 having cover walls 92A provided at side portions and a cover wall 92B provided at a lower portion in order for suppression of lateral and downward sound leakage. As depicted in FIG. 2, each of the cover walls 92A at the side portions has a side opening 92C allowing a drive shaft 31 and a tie rod 32 of the front wheel 91 to extend outward from the engine room 93. In order to suppress lateral sound leakage through the side opening 92C, the noise reflector 10 according to the present disclosure is disposed at a lower surface of a front side member 20.

Figure 3:
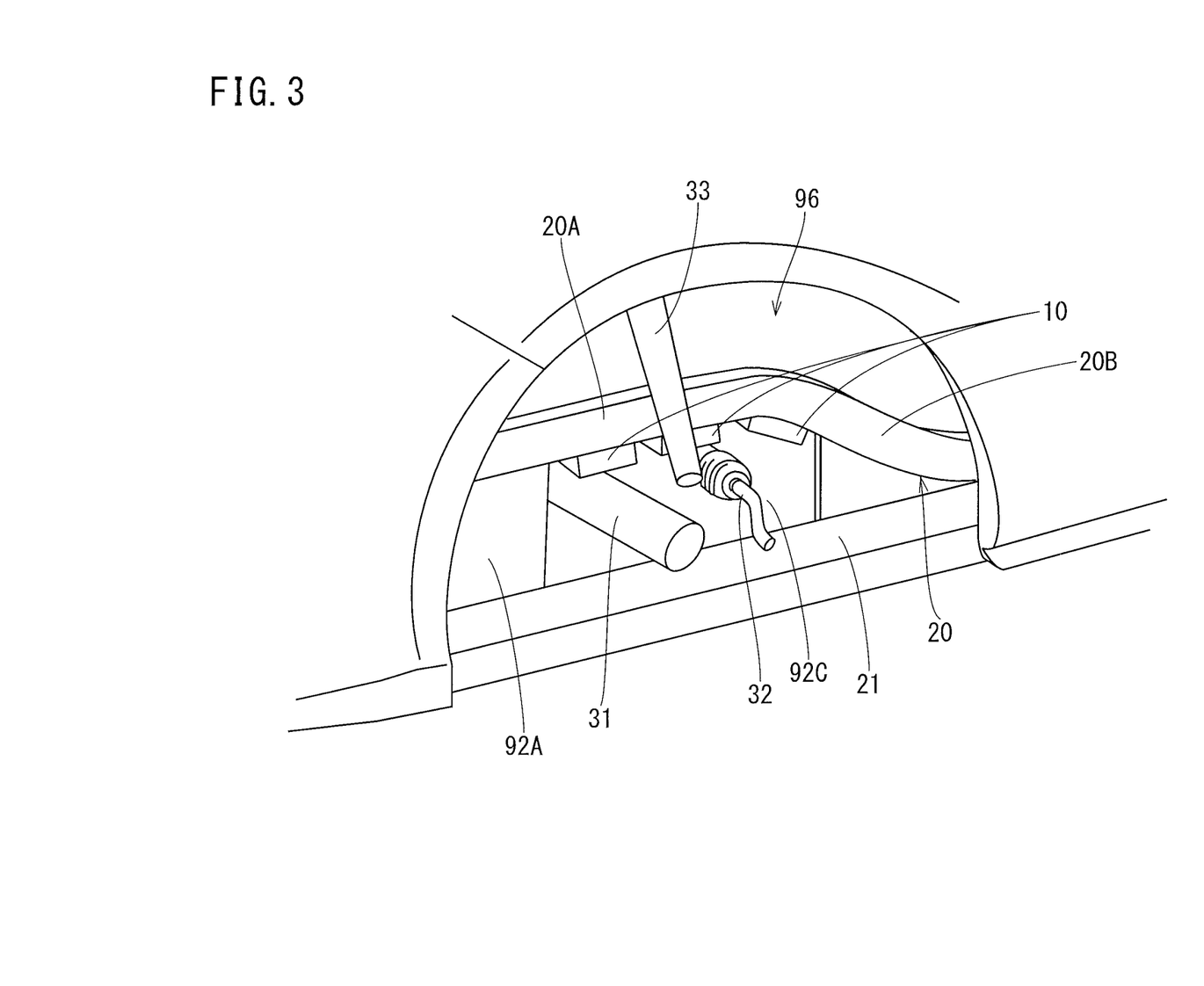
FIG. 3 is a perspective view of the wheelhouse from ahead of the vehicle.

The noise reflector 10 has surroundings specifically described below. As depicted in FIG. 1, the front side member 20 is positioned outside the cover wall 92A at the side portion, and exemplarily has a square tubular shape extending in an anteroposterior direction. As depicted in FIG. 3, the front side member 20 includes a horizontal portion 20A extending substantially horizontally from a front end to a position adjacent to a rear end, and a tilt portion 20B tilted downward from the horizontal portion 20A to the rear end.

Figure 4:
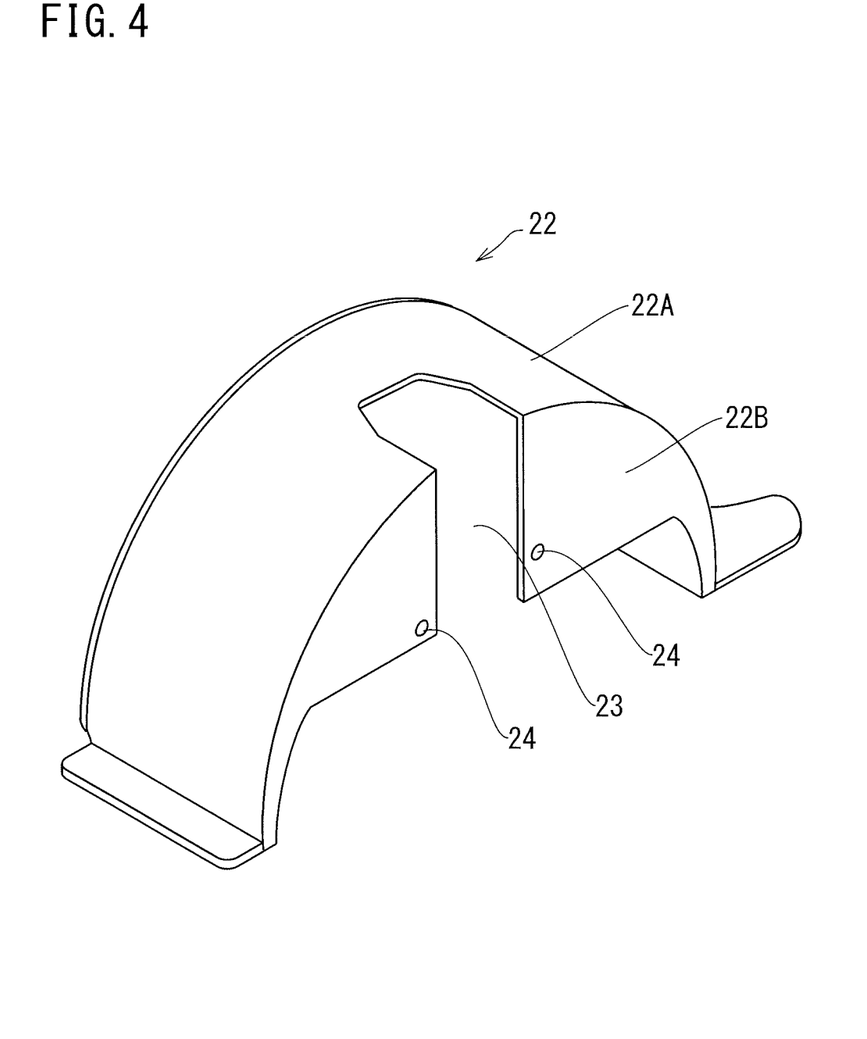
FIG. 4 is a perspective view of a fender liner from behind the vehicle.

A wheelhouse 96 is disposed at a position between a middle portion of the horizontal portion 20A and a front portion of the tilt portion 20B of the front side member 20. As depicted in FIG. 1, the wheelhouse 96 accommodates a fender liner 22 having an inner wall 22B overlapped with and fixed to an outer surface of the front side member 20. The fender liner 22 further includes an arc wall 22A covering the front wheel 91 from above and having a top portion provided with a cut-away portion 23 that is penetrated by a shock absorber 33 for the front wheel 91. The cut-away portion 23 allows the shock absorber 33 to pass therethrough in order for assembly of the fender liner 22 in the wheelhouse 96, and extends from the top portion of the arc wall 22A to a lower end of the inner wall 22B as depicted in FIG. 4. The inner wall 22B has both portions interposing the cut-away portion 23 and each having an attachment hole 24 distant from the lower end of the inner wall 22B. The inner wall 22B is fixed to the front side member 20 by fastening members B each passing through the corresponding attachment hole 24.

As depicted in FIG. 3, there is provided a sub frame 21 at a position below and distant from the front side member 20.

The sub frame 21 has a lower surface overlapped with the cover wall 92B mentioned above. The side opening 92C is positioned in the wheelhouse 96 and is opened between the front side member 20 and the sub frame 21.

In order to suppress lateral sound leakage through the side opening 92C, the lower surface of the front side member 20 is provided with a plurality of (e.g. three) noise reflectors 10 aligned in the anteroposterior direction and fixed to face the side opening 92C.

Figure 5A:
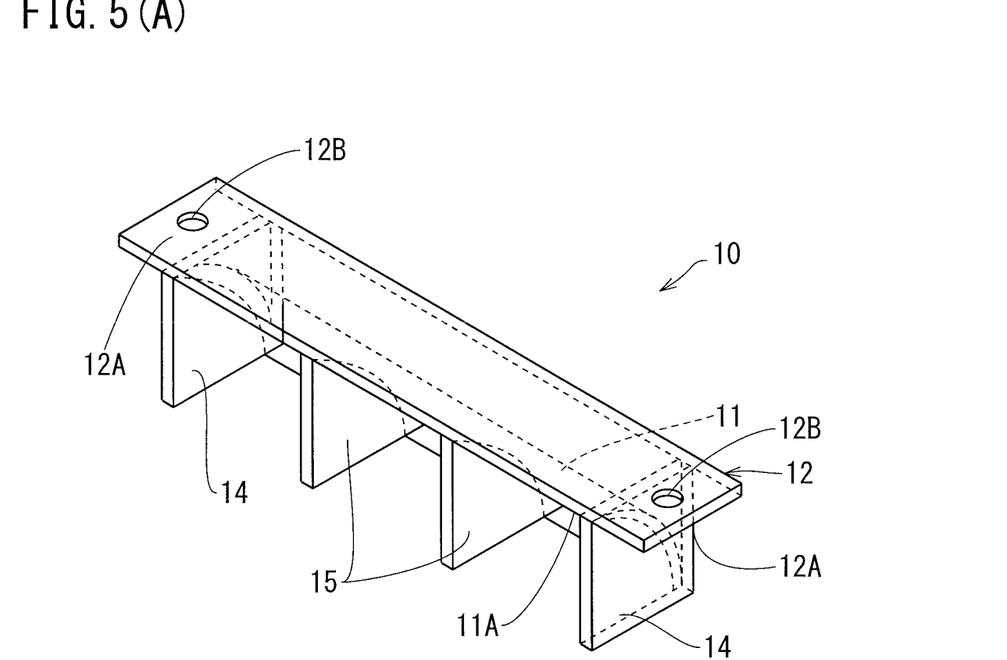
FIG. 5A is a perspective view of a noise reflector from a sound reflective surface.
Figure 5B:
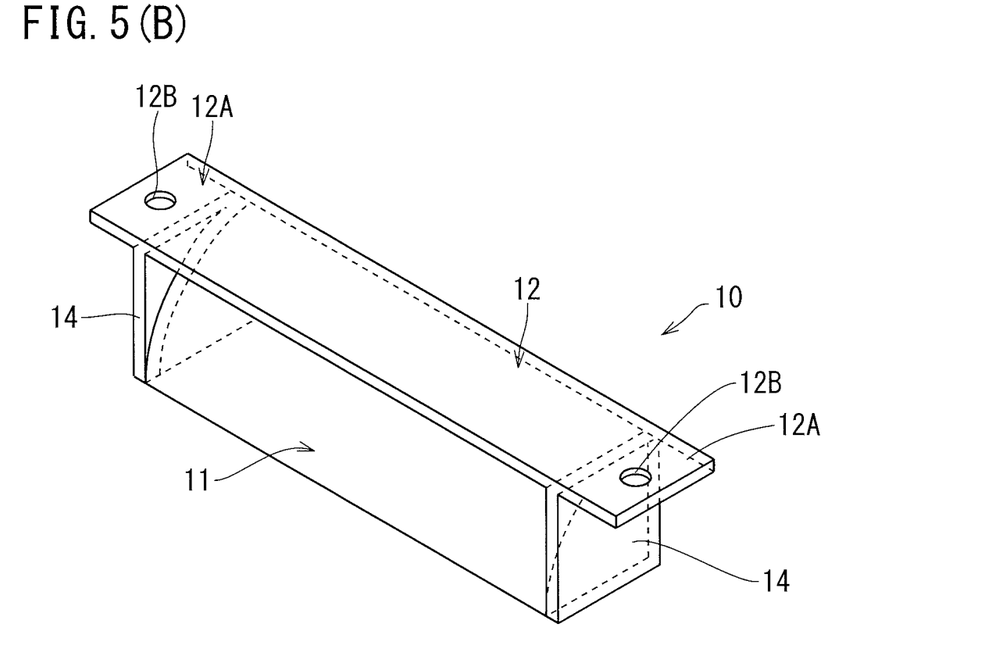
FIG. 5B is a perspective view of the noise reflector from an opposite point of the sound reflective surface.

Each of the noise reflectors 10 is exemplarily a resin injection molded product, and FIGS. 5A and 5B each depict the noise reflector 10 as an independent item. As depicted in FIG. 5A, the noise reflector 10 includes an attachment plate 12 having a belt shape and extending in a longitudinal direction of the front side member 20 (the anteroposterior direction of the vehicle 90). As depicted in FIG. 5B, the attachment plate 12 is provided, at positions adjacent to both ends in the longitudinal direction, with side protruding walls 14 each of which has a quadrilateral shape, is equal in width to the attachment plate 12, and extends vertically downward. The side protruding walls 14 interpose a sound reflective plate 11. The sound reflective plate 11 and the attachment plate 12 are arranged so as to form in a substantially "v" shape or "r" shape when viewed in a front-back direction.

The sound reflective plate 11 has a sectional shape of a quarter circle and extends in the longitudinal direction of the front side member 20. The sound reflective plate 11 has an outer circumferential surface having a radius substantially equal to the width of the attachment plate 12. One of side portions of the attachment plate 12 is integral with an upper portion of the sound reflective plate 11 such that one of plate thickness surfaces in a width direction of the attachment plate 12 and an upper one of plate thickness surfaces of the sound reflective plate 11 are provided in common, and the sound reflective plate 11 has both ends connected to the pair of side protruding walls 14.

The sound reflective plate 11 has an arc inner surface constituting a sound reflective surface 11A according to the present disclosure. The sound reflective surface 11A is preferred to have a curvature radius from 20 mm to 30 mm for example, and a perimeter from 30 mm to 50 mm. The sound reflective surface 11A is provided, at positions exemplarily trisecting a longitudinal length of the sound reflective plate 11, with a pair of partition protruding walls 15. The partition protruding walls 15 are shaped identically with portions, projecting from the inner surface of the sound reflective plate 11, of the side protruding walls 14.

The attachment plate 12 has end portions positioned outside the side protruding walls 14 and constituting fixing portions 12A each provided with an attachment hole 12B. The lower surface of the front side member 20 has a screw hole (not depicted) receiving a fastening bolt passing through the attachment hole 12B so as to fix the noise reflector 10 to the front side member 20.

The noise reflector 10 according to the present embodiment is the resin injection molded product, but may alternatively be a vacuum molded product. The noise reflector 10 is not limitedly made of a resin, but may alternatively be made of a metal for example. Fixing to the lower surface of the front side member 20 is made not limitedly by means of the bolt, but may alternatively be made by means of a rivet or an adhesive agent. The noise reflector 10 made of a metal may be fixed by welding or the like.

Figure 6:
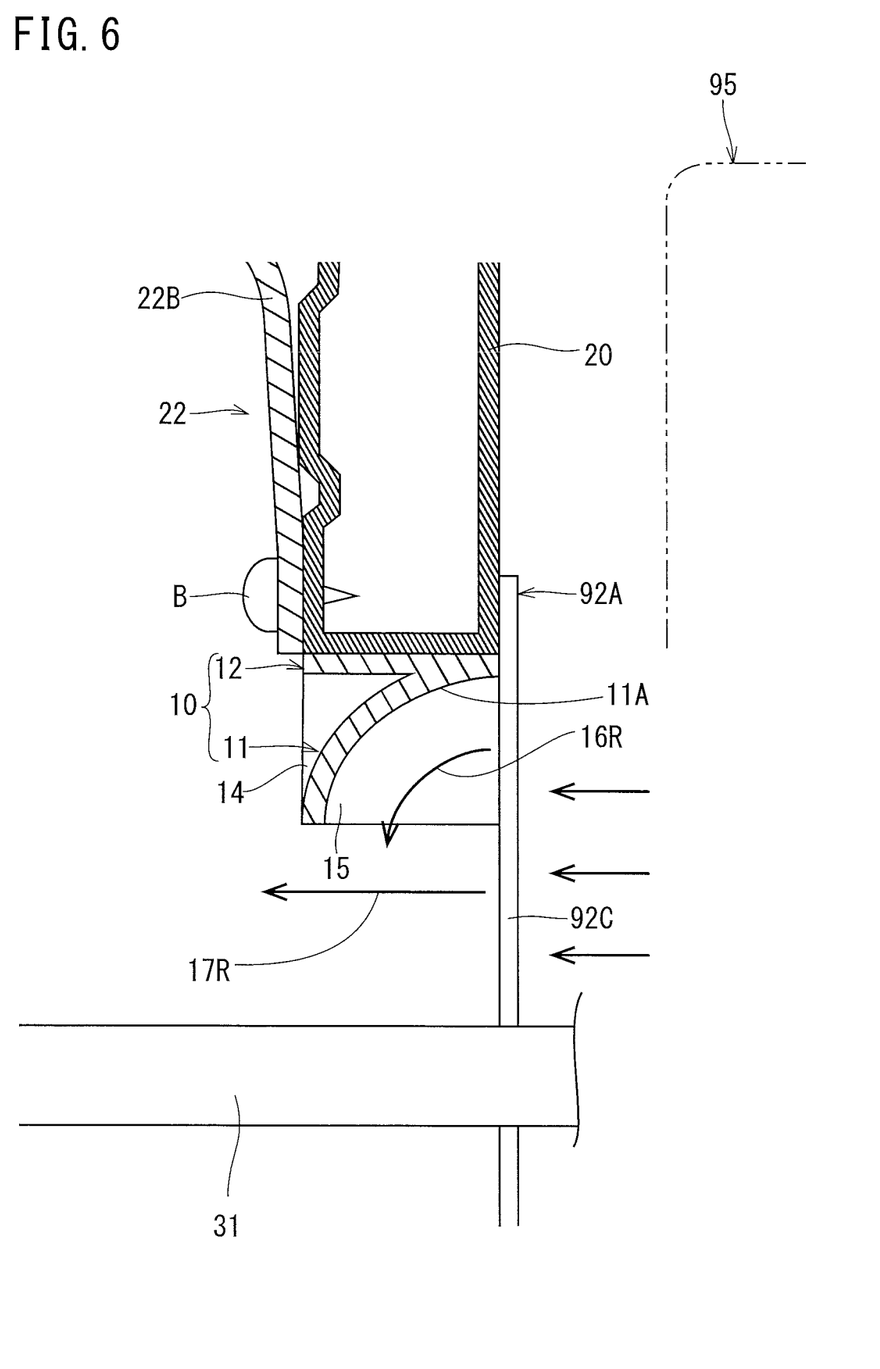
FIG. 6 is a view depicting a flow of engine sound laterally from a side opening.

The noise reflector 10 according to the present embodiment will be described next in terms of its functional effect. Engine sound generated in the engine room 93 flows laterally and passes through the side opening 92C and then between the front side member 20 and the sub frame 21 to leak outward from the vehicle. According to the present embodiment, the plurality of noise reflectors 10 is attached to the lower surface of the front side member 20 and has the sound reflective surfaces 11A disposed to face the side opening 92C. Accordingly, as depicted in FIG. 6, engine sound flowing laterally from the side opening 92C is divided into a first route 16R travelling along the sound reflective surface 11A and a second route 17R not traveling along the sound reflective surface 11A but travelling straight below the noise reflector 10 to leak outward from the vehicle.

Engine sound traveling along the first route 16R is reflected by the sound reflective surface 11A of the noise reflector 10 to be directed downward. Such engine sound then joins engine sound traveling straight along the second route 17R. Engine sound reflected by the sound reflective surface 11A has a wavelength shifted in phase from a wavelength of engine sound traveling straight. The former engine sound and the latter engine sound thus interfere with each other when joining together. Engine sound is accordingly reduced below the front side member 20 before leaking outward from the vehicle.

Noise level as a whole of engine sound can be lowered by lowering a noise level of sound having frequency at a highest noise level in engine sound leaking outward from the vehicle. It is thus desired to reduce sound in a frequency band from 800 Hz to 1250 Hz corresponding to a peak of engine sound. The sound reflective surface 11A having the curvature radius from 20 mm to 30 mm and the perimeter from 30 mm to 50 mm as in the present embodiment can effectively reduce sound having frequency around the frequency band mainly from 800 Hz to 1250 Hz.

The noise reflector 10 includes the pair of side protruding walls 14. When engine sound is reflected by an end portion, in the anteroposterior direction of the vehicle 90, of the sound reflective plate 11A, the side protruding walls 14 can thus prevent leakage of the engine sound from the noise reflector 10 in the anteroposterior direction of the vehicle 90. Engine sound traveling along the first route 16R can thus be fully directed downward to interfere with engine sound traveling along the second route 17R, for higher reduction efficiency of engine sound leaking outward from the vehicle.

The noise reflector 10 further includes the pair of partition protruding walls 15, and can thus suppress extension, in the anteroposterior direction of the vehicle 90, of engine sound reflected by the sound reflective surface 11A. Engine sound traveling along the first route 16R can thus be fully directed downward to efficiently interfere with engine sound traveling along the second route 17R.

The noise reflector 10 disposed inside the front side member 20 may interfere with various auxiliary devices, whereas the noise reflector 10 disposed outside the front side member 20 may interfere with the shock absorber 33. However, the noise reflector 10 according to the present embodiment, which is disposed below the front side member 20, will not interfere with these parts and can thus have enhanced flexibility in shape.

Moreover, the noise reflector 10 is provided as a separate part and can thus be commonly adopted to any one of types of vehicles different in shape of the front side member 20. The noise reflector 10 can be appropriately changed in terms of an attached position and the number thereof in accordance with positions and sizes of the drive shaft 31, the tie rod 32, and the like. The noise reflector 10 also includes the attachment plate 12 and can thus be attached easily.

Check Test

Description will be made to a check test on silencing effect of a silencing structure according to the present disclosure. This test was applied to following first and second examples for the vehicle having the silencing structure according to the present disclosure, and following first and second comparative examples for a vehicle not having the silencing structure according to the present disclosure. The first and second examples and the first and second comparative examples adopt identical vehicle bodies such as a four-wheel drive passenger car including a front engine of 2000 cc and provided with the side opening 92C having about 250 mm in width and about 150 mm in height.

Structures According to Examples and Comparative Examples

Figure 7A:
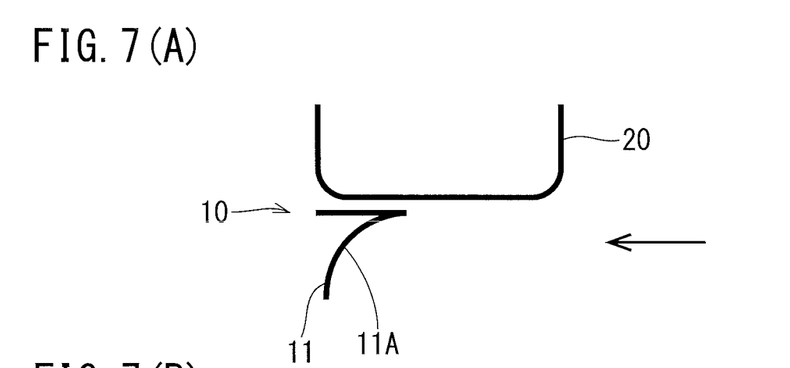
FIGS. 7A, 7B, and 7C are schematic diagrams depicting structures of noise reflectors according to a first example, a second example, and a first comparative example, respectively.

The first example relates to FIG. 7A, and three noise reflectors 10 according to the first embodiment are provided at the lower surface of the front side member 20 of the vehicle. The front side member 20 is wider than the noise reflectors 10 that are disposed adjacent to an outer end of the lower surface of the front side member 20. The noise reflectors 10 each have the sound reflective surface 11A having a curvature radius of 25 mm. The noise reflectors 10 each have 240 mm in length in the longitudinal direction of the front side member 20, 26 mm in width, and 26 mm in height.

Figure 7B:
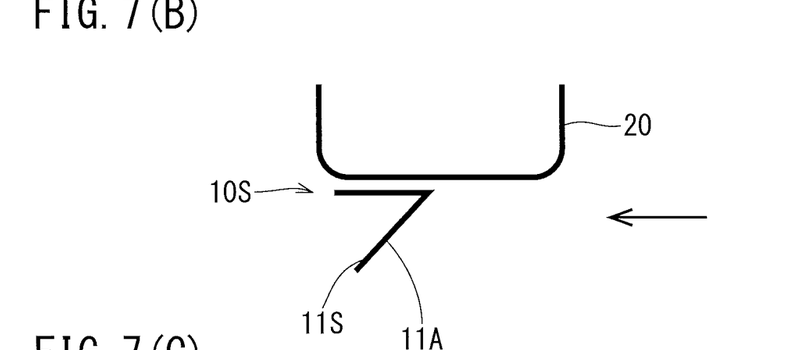

The second example relates to FIG. 7B, and the noise reflectors 10 according to the first example are replaced with noise reflectors 10S. Each of the noise reflectors 10S is different from the noise reflector 10 only in a structure of a sound reflective plate 11S. Specifically, the sound reflective plate 11S in the noise reflector 10S has a flat plate shape tilted from a vertical direction at a tilt angle of 45 degrees or the like, and the sound reflective surface 11A of the sound reflective plate 11S is a flat surface so as to be tilted downward as laterally separating away from the engine 95.

Figure 7C:
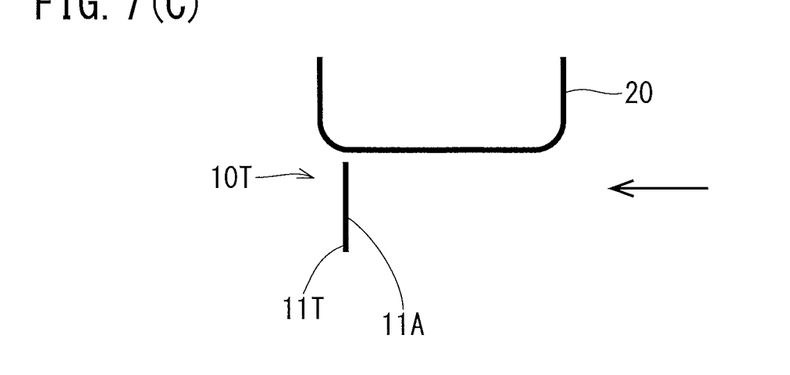

The first comparative example relates to FIG. 7C, and the noise reflectors 10 according to the first example are replaced with noise reflectors 10T. Each of the noise reflectors 10T is different from the noise reflector 10 only in a structure of a sound reflective plate 11T. Specifically, the sound reflective plate 11T in the noise reflector 10T has a flat plate shape perpendicular to the lower surface of the front side member 20.

Noise reflectors (not depicted) according to the second comparative example are not provided at the lower surface of the front side member 20.

Test Method

Figure 8:
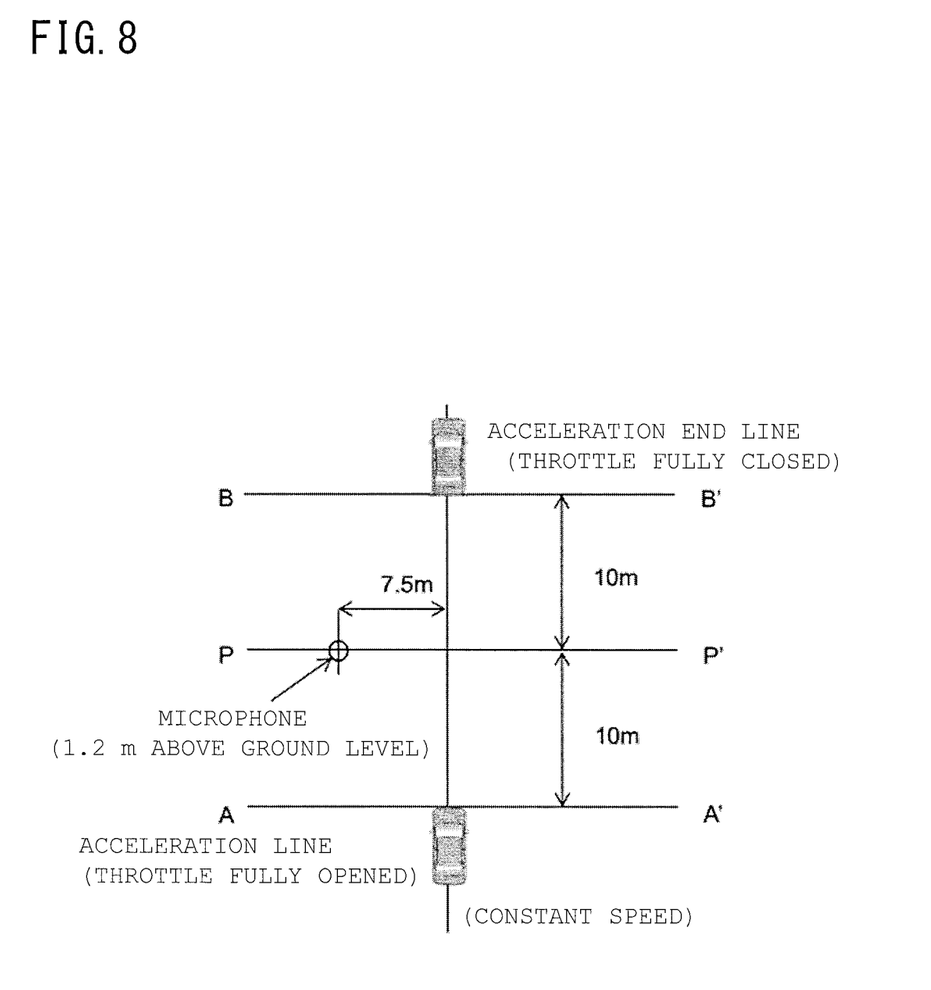
FIG. 8 is a plan view of a test track from above.

For testing, each of the vehicles according to the first and second examples and the first and second comparative examples entered an ISO track prescribed by ISO 10844 at a point A on an acceleration line at 50 km/h, then started acceleration with a throttle fully opened, and fully closed the throttle at a point B on an acceleration end line after traveling 20 m, as indicated in FIG. 8. Noise between the points was measured. A microphone was positioned at a point P on a line disposed between the acceleration line including the point A and the acceleration end line including the point B. The point P was distant from a center of the vehicle 90 by 7.5 m and has 1.2 m in height. Measured was a maximum noise level within a measurement section.

Figure 9:
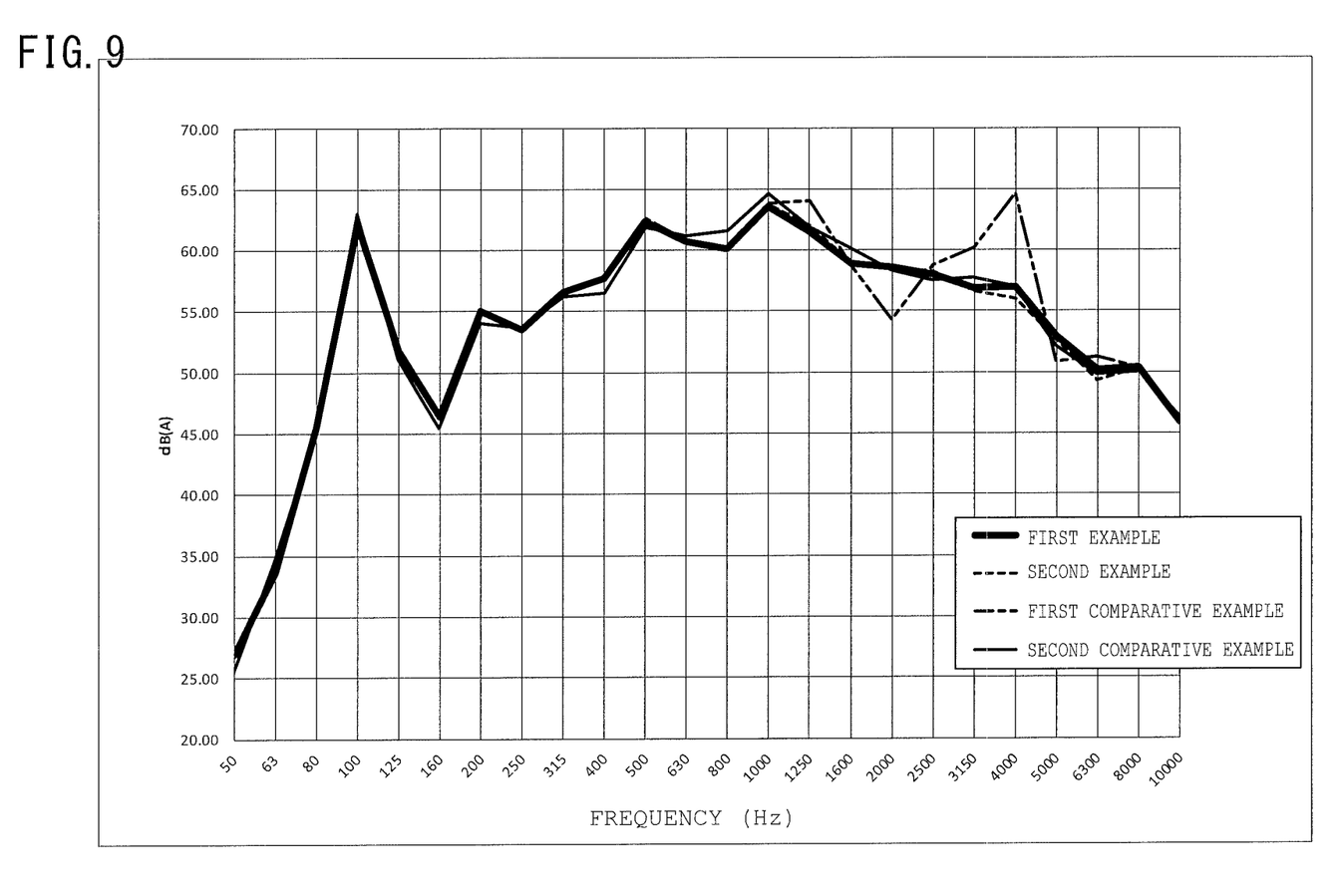
FIG. 9 is a graph indicating results of a check test.

FIG. 9 indicates measurement results of the examples 1 and 2 and the comparative examples 1 and 2. These measurement results indicate that the first and second examples were lower than the first and second comparative examples in noise level within the frequency band from 800 Hz to 1250 Hz. Each of the noise reflectors 10 and 10S according to the first and second examples is thus assumed to have a route difference, between the first route 16R and the second route 17R, having a range prescribed around ½ times of the wavelength in the frequency band from 800 Hz to 1250 Hz. Provision of the noise reflectors 10 and 10S according to the first and second examples was accordingly found to reduce the noise level of sound having frequency at the highest noise level.

The noise reflector 10T according to the first comparative example was found to have a region higher in noise level than the noise reflector according to the second comparative example in the frequency band from 800 Hz to 1250 Hz. The sound reflective surface directing engine sound downward was accordingly found to be preferably tilted downward as laterally separating away from the engine 95 rather than an upright wall facing the side opening 92C.

Second Embodiment

Figure 10:
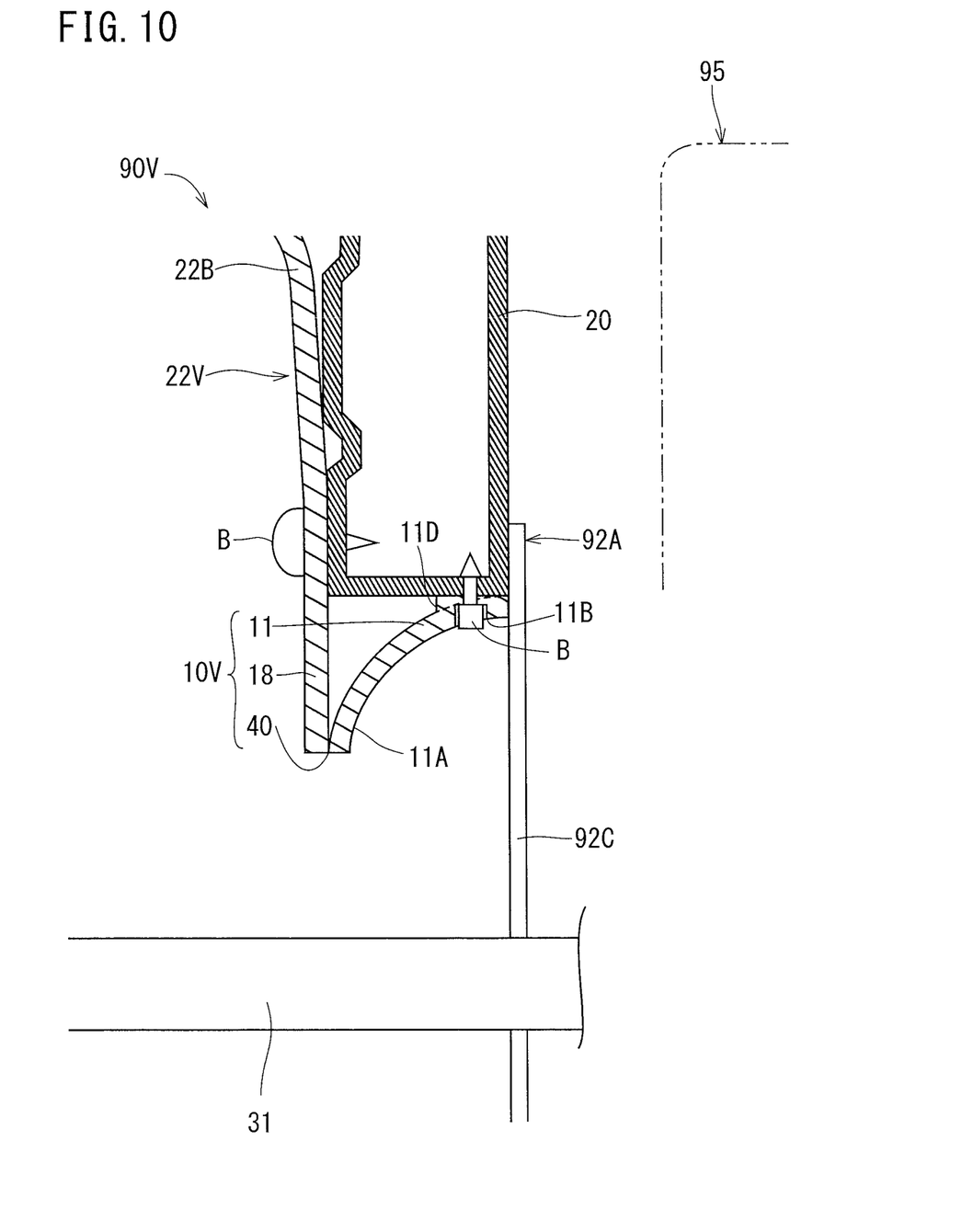
FIG. 10 is an enlarged sectional front view of a noise reflector according to a second embodiment.
Figure 11:
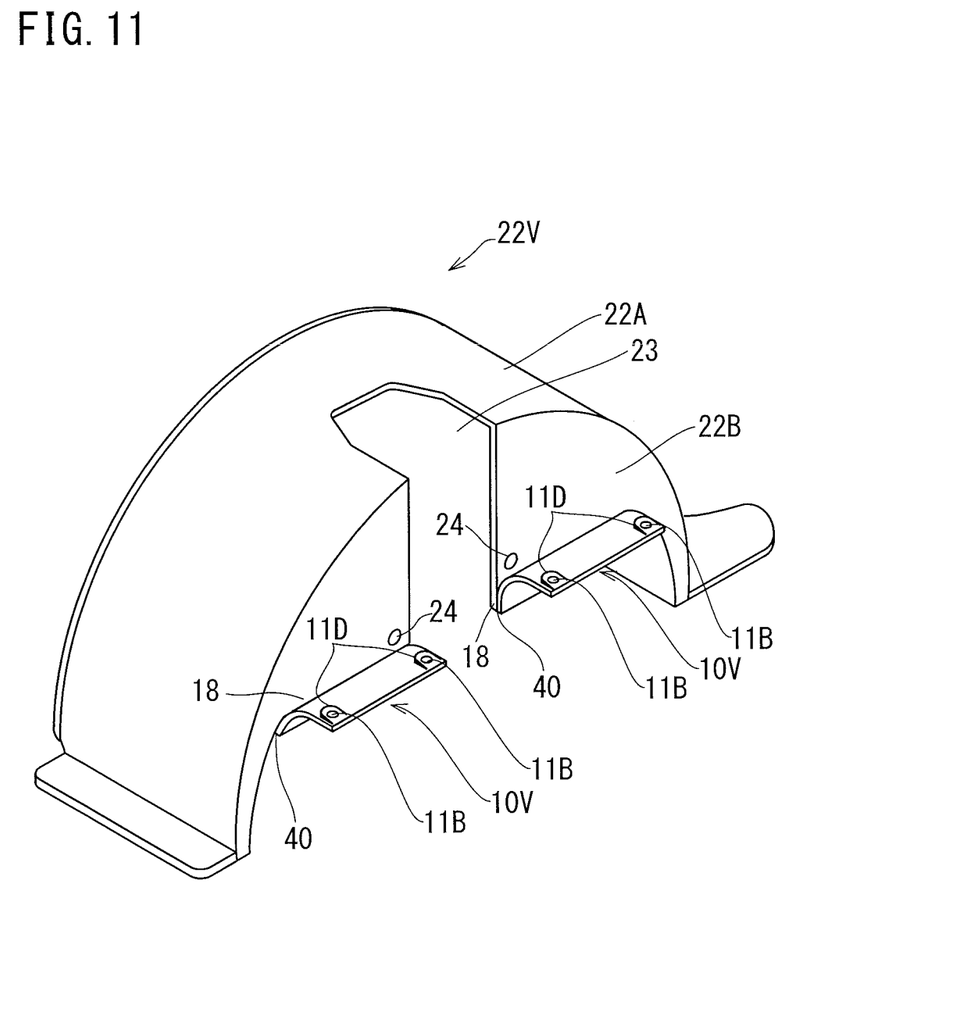
FIG. 11 is a perspective view of a fender liner from behind a vehicle.

FIGS. 10 and 11 each depict a noise reflector 10V according to the second embodiment of the present disclosure. The noise reflector 10V will be described hereinafter only in terms of differences from the noise reflector 10 according to the first embodiment, without repeated description of common structures.

The present embodiment provides a vehicle 90V including the noise reflector 10V provided integrally with a fender liner 22V. As depicted in FIG. 11, in the fender liner 22V according to the present embodiment, the lower end of the inner wall 22B is positioned between the top and the bottom of the arc wall 22A, and a lower end surface of the inner wall 22B has both portions interposing the cut-away portion 23 and being flush with each other to extend horizontally. As depicted in FIG. 10, the lower end of the inner wall 22B protrudes downward from the front side member 20 and is positioned above the drive shaft 31 and the tie rod 32 to face the side opening 92C. The both portions of the inner wall 22B, which interpose the cut-away portion 23 and face the side opening 92C, have a pair of sound reflective plates 11 overlapped with the portions. Assume that the portions of the inner wall 22B which interpose the cut-away portion 23 and protrude downward from the front side member 20 will be hereinafter called a pair of extended walls 18. As depicted in FIG. 11, the sound reflective plates 11 each have a lower end connected, via an integral hinge 40, to a lower end of a corresponding one of the extended walls 18.

The present embodiment provides noise reflectors 10V constituted by the sound reflective plates 11, the integral hinges 40, and the extended walls 18, and aligned anteroposteriorly to interpose the cut-away portion 23 in the inner wall 22B of the fender liner 22V. Each of the noise reflectors 10V does not include the attachment plate 12 of the noise reflector 10 according to the first embodiment. The noise reflector 10V does not either include the pair of side protruding walls 14 or the pair of partition protruding walls 15 of the noise reflector 10 according to the first embodiment.

The upper portion of the sound reflective plate 11 is provided with a pair of attachment holes 11B. As depicted in FIG. 10, each of the attachment holes 11B has a counter boring structure including a counterbored lower surface, and an upper opening edge provided with a protruding seat 11D. The attachment holes 11B are penetrated by the fastening members B (e.g. bolts, nuts, rivets, screws, or nylon latches) that fix the sound reflective plate 11 to the lower surface of the front side member 20.

The fender liner 22V according to the present embodiment is an injection molded product made of an olefinic thermoplastic resin such as polypropylene or polyethylene, or may alternatively be a vacuum molded product. The fender liner 22V is fixed to the lower surface of the front side member 20 not limitedly by means of the fastening members but alternatively by means of an adhesive agent.

The noise reflector 10V according to the present embodiment is integrally formed with the fender liner 22V. Two parts, namely, the sound reflective plate 11 and the extended wall 18, are connected to each other via the integral hinge 40. These two parts when in use having different die cutting directions are die cut in an identical direction when molding so as to be integrally molded. These parts having been molded are turned about the integral hinge 40 so as to be disposed for use. The two parts originally different in die cutting direction are thus die cut in the identical direction to be integrally molded, for reduction in production cost.

Third Embodiment

Figure 12:
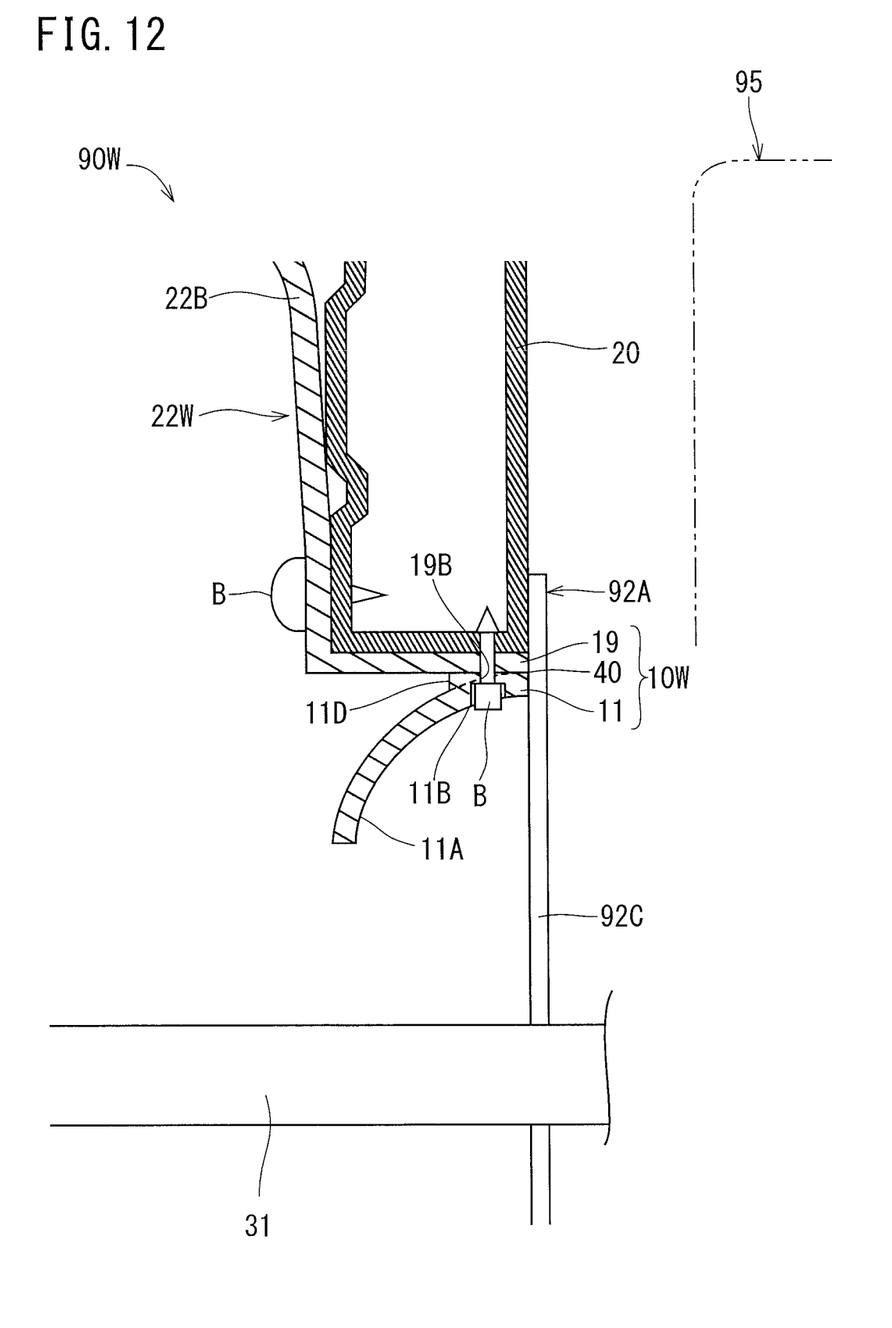
FIG. 12 is an enlarged sectional front view of a noise reflector according to a third embodiment.

The present embodiment relates to a vehicle 90W including a noise reflector integrally formed with a fender liner 22W, like the noise reflector 10V according to the second embodiment. As depicted in FIG. 12, the present embodiment provides a noise reflector 10W including a bent protruding piece 19 bent from the lower end of the inner wall 22B and overlapped with the lower surface of the front side member 20. The sound reflective plate 11 is connected to a tip end of the bent protruding piece 19 via the integral hinge 40.

The bent protruding piece 19 is provided with a pair of attachment holes 19B positioned to face the pair of the attachment holes 11B of the sound reflective plate 11. The attachment holes 11B and 19B are penetrated by the fastening members B that fix the bent protruding piece 19 and the sound reflective plate 11 to the front side member 20. The noise reflector 10W is constituted by the bent protruding piece 19, the integral hinge 40, and the sound reflective plate 11.

Other Embodiments (1) In the noise reflector 10 according to the first embodiment, the pair of partition protruding walls 15 partitions the sound reflective surface 11A at intervals substantially equal to the curvature radius of the sound reflective surface 11A. The intervals may alternatively be larger than or smaller than the curvature radius. Still alternatively, there may be provided no partition protruding wall 15, or there may be provided only one or more than two partition protruding walls 15.

(2) The noise reflector 10 according to the first embodiment includes the pair of side protruding walls 14, which may alternatively be excluded.

(3) According to the first embodiment, the noise reflector 10 is provided at the front side member 20 extending in the anteroposterior direction in the engine room 93 of the vehicle 90 including the engine 95 equipped in the front portion. The noise reflector 10 may alternatively be provided at a side member extending substantially entirely in the anteroposterior direction of the vehicle 90 including the engine 95 equipped in a portion other than the front portion.

(4) The noise reflectors 10, 10V, or 10W according to each of the above embodiments are provided to face substantially entirely a top of the side opening 92C. The noise reflectors may alternatively be provided to face part of the top of the side opening 92C.

The three noise reflectors 10 are provided in the first embodiment. Alternatively, there may be provided two or one noise reflector. Still alternatively, four or more noise reflectors may be provided in accordance with the width in the anteroposterior direction of the side opening 92C.

(5) The sound reflective surface 11A has the arc shape in each of the noise reflectors 10, 10V, and 10W according to the above embodiments. The sound reflective surface 11A may alternatively be a flat surface (see FIG. 7B) directed to the side opening 92C and tilted downward as laterally separating away from the engine 95. This flat surface is preferred to have a tilt angle from 40 degrees to 50 degrees with respect to the vertical direction as a disposition direction of the noise reflector, and to have a vertical length from 20 mm to 30 mm. Such a configuration can also achieve reduction in noise level in the frequency band from 800 Hz to 1250 Hz as in FIG. 9 indicating the measurement result of the second example.

Figure 13:
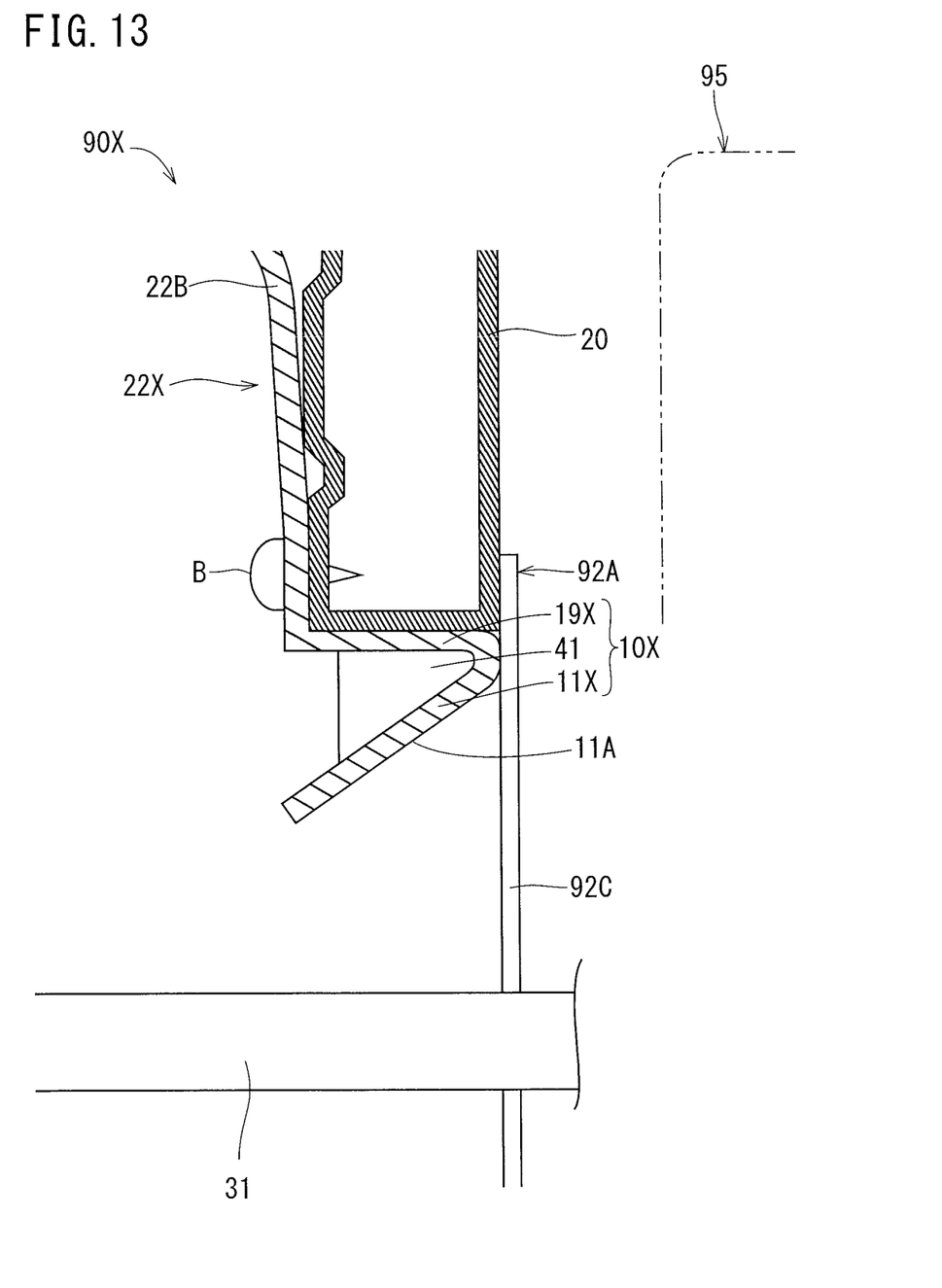
FIG. 13 is an enlarged sectional front view of a noise reflector according to a different embodiment.

In this case, the sound reflective plate 11 may be connected to the tip end of the bent protruding piece 19 via the integral hinge 40 as in the third embodiment and the seats 11D provided at the attachment holes 11B of the sound reflective plate 11 may be butted against the bent protruding piece 19 to fix the tilt angle of the sound reflective surface 11A. Alternatively, as depicted in FIG. 13, the lower end of the inner wall 22B may be bent at two positions to provide a bent protruding piece 19X and a sound reflective plate 11X, and a lower surface of the bent protruding piece 19X and an outer surface of the sound reflective plate 11X may be coupled to each other via a rib 41 to fix the tilt angle of the sound reflective surface 11A.

Figure 14A:
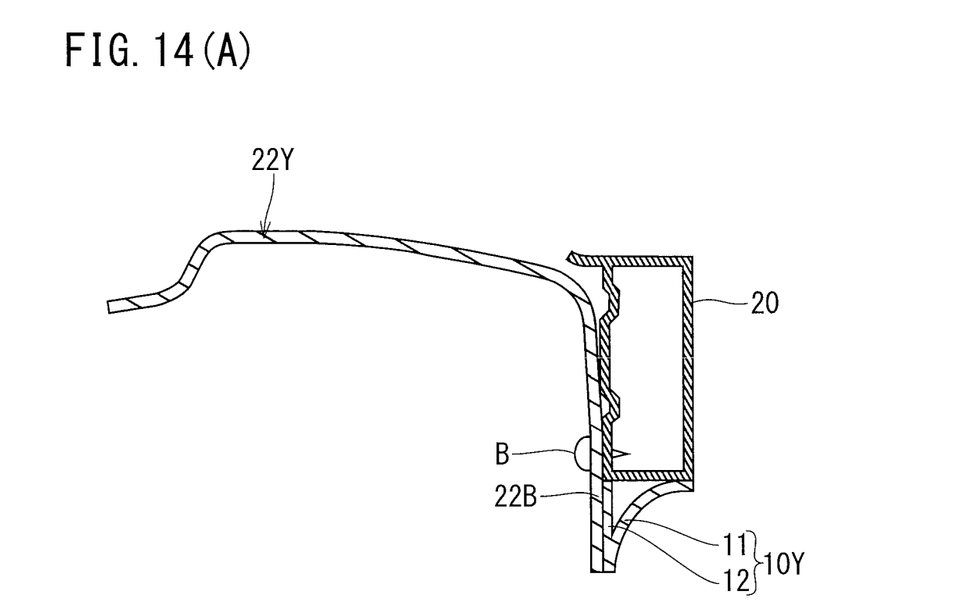
FIGS. 14A and 14B are sectional front views of noise reflectors according to still different embodiments.

(6) The noise reflectors 10V and 10W according to the second and third embodiments are integrally formed with the fender liners 22V and 22W, respectively. Alternatively, there may be provided an independent noise reflector 10Y that may be fixed to the inner wall 22B of a fender liner 22Y as in the first embodiment. As depicted exemplarily in FIG. 14A, the lower end of the inner wall 22B of the fender liner 22Y may project downward from the lower surface of the front side member 20, and such a projecting portion may be overlapped with the attachment plate 12 of the noise reflector 10Y.

Figure 14B:
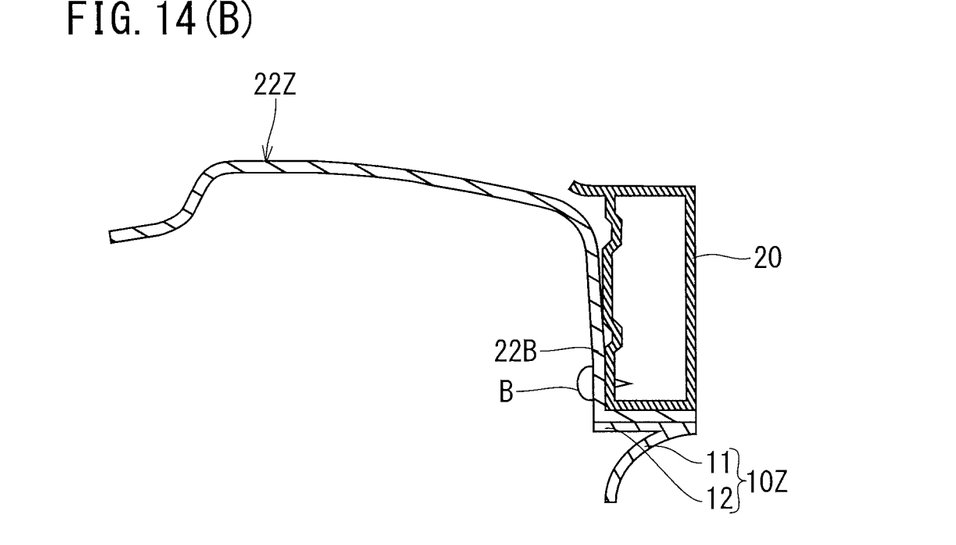

Alternatively, as depicted in FIG. 14B, the lower end of the inner wall 22B of a fender liner 22Z may be bent to be overlapped with the lower surface of the front side member 20, and such an overlapped portion may be provided with the attachment plate 12 of a noise reflector 10Z.

(7) Each of the noise reflectors according to the above embodiments is applied to the vehicle 90 including the engine 95. The noise reflector may alternatively be applied to an electric vehicle including a motor or a hybrid vehicle including a motor and an engine.

What is claimed is:

1. A noise reflector of a vehicle comprising a side member, a wheel and a machine, the noise reflector comprising:
a sound reflective plate disposed under the side member, the side member being placed between the machine and the wheel,
wherein the sound reflective plate is tilted so that a position of a first end of the sound reflective plate at a wheel side is lower than a position of a second end of the sound reflective plate at a machine side; and
the machine is either a motor or an engine.

2. The noise reflector according to claim 1, wherein sound reflective plate comprises a sound reflective surface as one of front and rear surfaces of the sound reflective plate.

3. The noise reflector according to claim 2, wherein the sound reflective plate has a concave shape where a middle part thereof protrudes upwards.

4. A vehicle, comprising the noise reflector of claim 1, the side member, the wheel and the machine.

5. The noise reflector of claim 1, wherein the sound reflective plate is disposed directly under the side member.

6. The noise reflector of claim 1, wherein the side member is a side member extending along a substantially entire side in an anteroposterior direction of the vehicle, or a front side member extending in the anteroposterior direction in a machine room of the vehicle.

7. The noise reflector according to claim 2, wherein the sound reflective surface is an arc surface having a curvature radius from 20 mm to 30 mm and a perimeter from 30 mm to 50 mm.

8. The noise reflector according to claim 2, wherein the sound reflective surface is a flat surface having a tilt angle from 40 degrees to 50 degrees from the vertical direction and a vertical length from 20 mm to 30 mm.

9. The noise reflector according to claim 2, comprising a pair of side protruding walls protruding from both ends of the sound reflective surface in an anteroposterior direction of the vehicle and facing each other in the anteroposterior direction.

10. The noise reflector according to claim 2, comprising a partition protruding wall protruding from a halfway position on the sound reflective surface in an anteroposterior direction of the vehicle and partitioning the sound reflective surface in the anteroposterior direction.

11. The noise reflector according to claim 2, wherein the noise reflector is made of a resin and
the noise reflector further comprises an attachment plate disposed on an opposite side to the sound reflective surface in the sound reflective plate.

12. The noise reflector according to claim 11, wherein the attachment plate is fixed to the lower surface of the side member or a lower edge of a fender liner.

13. A fender liner having an inner wall overlapped with an outer surface of a side member of a vehicle,
the fender liner comprising at least one noise reflector according to claim 1 at a lower end of the inner wall.

14. The fender liner according to claim 13, further comprising a cut-away portion extending from the lower end of the inner wall to an upper surface of the fender liner and anteroposteriorly dividing the inner wall into two portions to receive a shock absorber, wherein
the at least one noise reflector includes a plurality of noise reflectors aligned anteroposteriorly to interpose the cut-away portion.

15. The fender liner according to claim 13, wherein the noise reflector includes a bent protruding piece bent from the lower end of the inner wall and overlapped with a lower surface of the side member, and the sound reflective plate coupled to a tip end of the bent protruding piece via an integral hinge and bent downward below a lower surface of the bent protruding piece at the integral hinge, and the sound reflective plate has a sound reflective surface as one of front and rear surfaces.

16. The fender liner according to claim 13, wherein the noise reflector includes an extended wall extended downward from the inner wall and projecting downward from a lower surface of the side member, and the sound reflective plate coupled to a lower end of the extended wall via an integral hinge and bent at the integral hinge toward a surface, adjacent to an engine, of the extended wall, and the sound reflective plate has a sound reflective surface as one of front and rear surfaces.

17. The fender liner according to claim 16, wherein the sound reflective plate has an attachment hole penetrated by a fastening member fixing the fender liner to the side member.

18. A silencing method for reducing engine sound passing below a side member of a vehicle and leaking laterally from the vehicle,
the silencing method comprising causing engine sound to be reflected downward by the noise reflector according to claim 1.

19. The silencing method according to claim 18, wherein engine sound reflected by the noise reflector to be lowered in noise level of sound having frequency at a highest noise level in engine sound leaking laterally from the vehicle interferes the engine sound passing below the side member while being shifted in phase.

* * * * *